United States Patent [19]

Kennedy

[11] Patent Number: 5,022,761
[45] Date of Patent: Jun. 11, 1991

[54] RING LASER GYROSCOPE WITH A TUBE ASSEMBLY

[76] Inventor: Thomas W. Kennedy, 134 Wildwood Ave., Montclair, N.J. 07043

[21] Appl. No.: 431,993

[22] Filed: Nov. 6, 1989

[51] Int. Cl.⁵ .................. G01C 19/68; H01S 3/083
[52] U.S. Cl. ............................ 356/350; 372/94; 372/97
[58] Field of Search ............... 356/350; 372/94, 97, 372/103

[56] References Cited

U.S. PATENT DOCUMENTS

| | | | |
|---|---|---|---|
| 4,035,081 | 7/1977 | Sepp et al. | 356/350 |
| 4,521,110 | 6/1985 | Roberts et al. | 356/350 |
| 4,616,930 | 10/1986 | Martin | 356/350 |

*Primary Examiner*—Vincent P. McGraw

[57] ABSTRACT

A ring laser gyroscope, which has a triangular quartz block with a triangular quartz tube assembly forming an outer cavity for one rotating beam and an inner cavity for an oppositely rotating beam, is provided. The problem of lock-in of the beams is avoided. A pair of anodes and cathode means are provided for energizing the beams. A mirror is mounted at each corner of the block for reflecting the beams with one mirror being a partly reflective mirror for passing through portions of the inner beam and the outer beam. Outside the partly reflective mirror are mounted a first mirror for reflecting the inner beam, a second mirror for reflecting the outer beam, and a beam combiner mirror for combining the beams. A frusto-conical mirror receives the combined beams and reduces the mean diameter of the outer beam. A fringe detector receives the inner beam and outer beam on an area or point on a face of the fringe detector, which provides a gyroscope output.

7 Claims, 1 Drawing Sheet

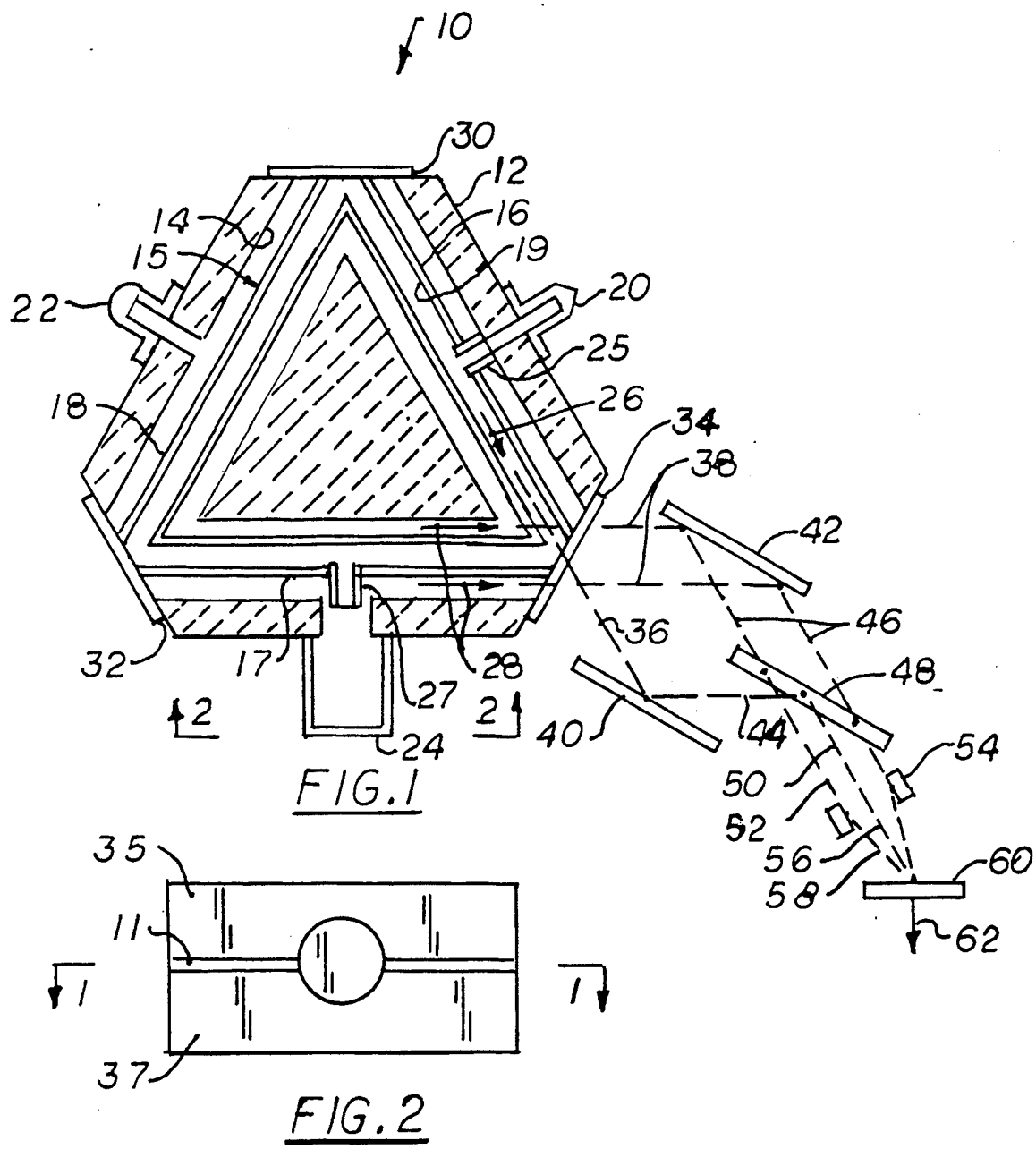

RING LASER GYROSCOPE WITH A TUBE ASSEMBLY

The invention relates to a ring laser gyroscope with a tube assembly, and in particular the invention relates to a ring laser gyroscope with a tube assembly forming an inner cavity for a clockwise beam and an outer cavity for a counterclockwise beam for avoiding lock-in.

BACKGROUND OF THE INVENTION

A prior art ring laser gyroscope is described in U.S. Pat. No. 4,344,706, issued Aug. 17, 1982 and U.S. Pat. No. 4,473,297, issued Sept. 25, 1984. The prior art gyroscope comprises a triangular block which has a triangular cavity for both a clockwise beam and a counterclockwise beam, a pair of anodes and a cathode for energizing the beams, three mirrors respectively located at the three corners of the block, a beam combiner assembly for measuring the gyroscope output, and means to minimize beam lock-in.

A problem with the prior art gyroscope is that the means to minimize lock-in is not sufficiently effective for some installations. The lock-in is a region of angular rate input around zero input rate in which the two oppositely directed traveling waves or beams are synchronously locked due to mutual coupling therebetween.

SUMMARY OF THE INVENTION

According to the present invention, a ring laser gyroscope is provided. This unit comprises a triangular block having an outer cavity for a counterclockwise beam, a tube assembly having a coaxial inner cavity for a clockwise beam, a pair of anodes and a cathode for energizing the beams, three mirrors respectively located at the three corners of the triangular block, and a beam combiner assembly having a frusto-conical mirror for combining the beams and having a fringe detector for measuring the gyroscope output.

By using the structure of the tube assembly, the counterclockwise beam is separated from the clockwise beam thereby avoiding lock-in.

BRIEF DESCRIPTION OF THE DRAWINGS

The above advantages and subsequent description will be more readily understood by reference to the following drawings.

FIG. 1 is a section view of a ring laser gyroscope according to the invention as taken along the line 1—1 of FIG. 2; and FIG. 2 is a partial elevation view of the gyroscope as taken along the line 2—2 of FIG. 1.

DESCRIPTION OF THE PREFERRED EMBODIMENTS

In FIG. 1, a ring laser gyroscope is shown. Gyroscope 10 has a triangular block 12, which is a quartz block. Block 12 has an outer cavity 14 of triangular shape. Block 12 also has a tube assembly 15, which has a triangular shape. Tube assembly 15 includes tube 16, tube 17, and tube 18, which form an inner cavity 19 of triangular shape. Block 12 also has a first anode 20, a second anode 22 and a cathode 24. Tube 16 has an anode tube connector 25 for its connection to anode 20. Tube 17 has a cathode tube connector 27 for its connection to cathode 24.

Inner cavity 19 carries an inner clockwise light beam 26. Outer cavity 14 carries an outer counterclockwise light beam 28.

Tube assembly 15 is composed of quartz material. Quartz block 12 has a construction joint 11, which is located midway between an upper portion 35 and a lower portion 37 of block 12. FIG. 1 is a section view, which is taken approximately at the construction joint 11, that is disposed between upper portion 35 and lower portion 37. Gyroscope 10 senses angular rate about its axis.

In the method of manufacture of gyroscope 10, upper portion 35 and lower portion 37 of block 12, which are identical but opposite hand, are joined at joint 11 by a suitable adhesive or by a heat treating process or the like after tube assembly 15 is positioned therebetween. In FIG. 2, the thickness of joint 11 has been enlarged for ease of illustration. Beam 28 is coaxial with beam 26 within each leg of outer cavity 14. Block 12 and tube assembly 15 are composed of quartz, which exhibits a relatively low thermal expansion.

A mirror 30 is joined to block 12 by an adhesive and is joined to tubes 16 and 18 by an adhesive. A mirror 32 is joined to block 12 by an adhesive and is joined to tubes 17 and 18 by an adhesive. In this way, the inner clockwise beam 26 is not in contact with the outer counterclockwise beam 28. A mirror 34 is also joined to block and tubes.

Inner beam 26 passes through mirror 34 and forms beam 36. Outer beam 28, which is a concentric beam, has an inner diameter of a size about equal to the outer diameter of tube 17.

Outer beam 28 passes through mirror 34 and forms beam 38. Beam 36 is reflected by a mirror 40 forming beam 44. Beam 38 is reflected by a corresponding mirror 42 forming a beam 46.

Beam 44 is reflected by a beam combiner 48 forming beam 50. Beam 46 passes through beam combiner 48 forming concentric beam 52. Beam 50 passes through a frusto-conical mirror 54 forming beam 56. Beam 52 is reflected by frusto-conical mirror 54 and forms a beam 58, which is coincident with beam 56 at the face of a fringe detector 60. Detector 60 provides a gyroscope output 62.

The frusto-conical mirror 54 is approximately a ring-shaped frustrum of a cone, which has a reflecting inner surface. Beam 52 is ring-shaped in cross section view. Mirror 54 has a width of sufficient size to reflect beam 52. Mirror 54 is similar to a transverse portion or section of a flashlight reflector, which is modified.

The method of manufacture of gyroscope 10 is indicated hereafter. Form or prepares a block 12 having a construction joint 11 disposed between upper portion 35 and lower portion 37 and having cavity portions forming a multisided outer cavity 14. Form or prepare a tube assembly 15 having a multisided inner cavity 19. Place the tube assembly 15 within the outer cavity 14 between the upper portion 35 and lower portion 37. Join a respective mirror 30, 32, 34 to block 12 at each corner of outer cavity 14, including partly reflective mirror 34. Join each mirror 30, 32, 34 to an adjacent portion of tube assembly 15 for sealing inner cavity 19 from outer cavity 14. Mount a pair of anodes 20, 22 and a cathode 24 on block 12 for providing an inner beam 26 in inner cavity 19 rotatable in one direction and an outer beam 28 in outer cavity 14 rotatable in an opposite direction. Join upper portion 35 of block 12 to lower portion 37 of block 12.

While the invention has been described in its preferred embodiments, it is to be understood that the words which have been used are words of description rather than limitation and that changes may be made within the purview of the appended claims without departing from the true scope and spirit of the invention in its broader respects.

For example, in another embodiment of the invention, the block 12 is a solid block without a construction joint. The portions of the outer cavity 14, and the portions of the inner cavity and tube are made by cutting, or by drilling, or by electric melting, or by other well known process, using a machine set up and sighting from a respective corner of block 12. One or more support spokes or fins, which are disposed between the outer surfaces of tubes 16, 17, 18, and the inner surfaces of outer cavity 14, would be left, during the cutting process, adjacent to anodes 20, 22 and cathode 24, for supporting tubes 16, 17, 18. In this way, a quartz tube assembly 15 is made by cutting the quartz block 12.

For such method of manufacture, the steps are indicated hereafter. Cut a multisided inner cavity in a multisided block by successively using a cutting device mounted at each respective corner of block 12. Cut a multisided outer cavity 14 of ring-shaped cross section in the block 12 by successively using a cutting device mounted at each respective corner of the block 12 for forming a multisided tube assembly 15 completely separating inner cavity 19 from outer cavity 14. Join a mirror 30, 32, 34 to a portion of block 12 and to a portion of tube assembly 15 at each corner of block 12, including the partly reflective mirror 34. Mount a pair of anodes 20, 22 and a cathode 24 on block 12 for providing an inner beam 26 in inner cavity 19 rotatable in one direction and for providing an outer beam 28 in outer cavity 14 rotatable in an opposite direction. Mount a beam combiner assembly 40, 42, 48, 54, 60, outside and adjacent to the partly reflective mirror 34.

As another example, a gyroscope of four or more sides can be provided, which has a tube assembly.

As another example, the frusto-conical mirror 54 can be relocated to a position between mirror 34 and mirror 42, so that beam 38 becomes a beam, like beam 44, when reflected from the face of mirror 42, and so that the two beams are coaxial and coincident upon leaving mirror 48 and upon contacting detector 60.

As another example, two cathodes can be used, with a first cathode for outer cavity 14, and with a second cathode for inner cavity 19. Then, tube 27 would connect to the second cavity and would be angularly displaced from the first cathode about the tube axis.

The embodiments of an invention in which an exclusive property or right is claimed are defined as follows:

1. A ring laser gyroscope comprising:
   a block having an outer cavity for an outer beam;
   a tube assembly having a coaxial inner cavity for an inner beam;
   a pair of anodes and a cathode for energizing the beams;
   a plurality of mirrors respectively disposed at the corners of the block; and
   a beam combiner and detector assembly for combining the beams and for providing a gyroscope output whereby lock-in is avoided.

2. The gyroscope of claim 1, wherein the beam combiner and detector assembly includes:
   a first mirror for reflecting the inner beam;
   a second mirror for reflecting the outer beam;
   a beam combiner mirror for combining the beams;
   a beam reducing means for reducing the diameter of the outer beam in order for the outer beam to coincide substantially at a point with the inner beam; and
   a fringe detector for receiving the inner beam and the outer beam for providing a gyroscope output.

3. The gyroscope of claim 2, wherein the beam reducing means includes a frusto-conical mirror which is disposed between the beam combiner mirror and the fringe detector for impinging the outer beam and the inner beam on approximately the same area on the fringe detector.

4. A ring laser gyroscope comprising:
   a block having an outer cavity for an outer beam;
   partition wall means disposed in the outer cavity and having a coaxial inner cavity for an inner beam which is coaxial with the outer beam;
   anode means and cathode means for energizing the beams;
   a plurality of mirrors respectively disposed at the corners of the block; and
   beam combiner and detector means for combining the beams and for providing a gyroscope output.

5. A method of manufacture of a ring laser gyroscope including the steps of:
   forming a block having a construction joint disposed normal to a rotation axis and disposed between an upper portion and a lower portion of the block, with the upper portion and lower portion having respective cavity portions for forming a multisided outer cavity;
   forming a partition wall assembly having a multisided inner cavity disposed so that the partition wall assembly is within the outer cavity between the upper portion and the lower portion of the block;
   connecting a respective mirror to the block at each corner of the outer cavity including one partly reflective mirror and connecting the mirror at each corner to an adjacent portion of the partition wall assembly for separating the inner cavity from the outer cavity;
   mounting anode means and cathode means on the block for providing respectively an inner beam and an outer beam; and
   joining the upper portion to the lower portion along the construction joint.

6. The method of claim 5 including the steps of:
   mounting a pair of mirrors adjacent said partly reflective mirror for respectively reflecting the inner beam and the outer beam;
   mounting a beam combiner mirror adjacent said pair of mirrors for combining said beams;
   mounting a beam diameter reducing mirror adjacent said beam combiner mirror for reducing the diameter of the outer beam; and
   mounting a fringe detector adjacent said beam diameter reducing mirror for receiving the inner beam and the outer beam on about the same area on a face of the fringe detector.

7. A method of manufacture of a ring laser gyroscope including the steps of:
   cutting a multisided inner cavity in a multisided block with corners by using a cutting device mounted in succession at each respective corner of the block;
   cutting a multisided outer cavity of ring shaped cross section in the block by using a cutting device mounted in succession at each respective corner of the block for forming a multisided partition wall assembly completely separating the inner cavity from the outer cavity;

joining a mirror to a portion of the block and to a portion of the partition wall assembly at each corner of the block, including one partly reflective mirror;

mounting anode means an cathode means on the block for providing an inner beam in the inner cavity rotatable in one direction and for providing an outer beam in the outer cavity rotatable in an opposite direction; and mounting a beam combiner assembly adjacent to the partly reflective mirror.

* * * * *